United States Patent [19]

Moriwaki et al.

[11] Patent Number: 4,831,074

[45] Date of Patent: May 16, 1989

[54] PLASTIC COMPOSITE AND THE PROCESS FOR MANUFACTRING THE SAME

[75] Inventors: Takeshi Moriwaki; Kenji Tsutsui, both of Osaka, Japan

[73] Assignee: Kishimoto Sangyo Company Ltd., Osaka, Japan

[21] Appl. No.: 182,486

[22] Filed: Apr. 15, 1988

[30] Foreign Application Priority Data

May 11, 1987 [JP] Japan ................................ 62-113831

[51] Int. Cl.$^4$ ............................................... C08K 3/40
[52] U.S. Cl. ..................................... 524/494; 523/214; 523/217; 428/325
[58] Field of Search ................ 523/214, 217; 524/494; 428/325, 477.7, 474.4, 435

[56] References Cited

U.S. PATENT DOCUMENTS 4,254,010  3/1981  Mizuno et al. ...................... 523/214
4,533,680  8/1985  Kasuga et al. ...................... 524/494

Primary Examiner—George F. Lesmes
Assistant Examiner—A. Harbin
Attorney, Agent, or Firm—Koda and Androlia

[57] ABSTRACT

The present invention is directed to a high specific gravity composite giving high-strength, rustproofing, and aesthetic products. The plastic composite is composed of 50–95 weight percent of glassy powder comprising 80 weight percent or more of lead monoxide (PbO) having particle size under 150 mesh, with balanced amount of resin and reinforcement.

4 Claims, No Drawings

PLASTIC COMPOSITE AND THE PROCESS FOR MANUFACTRING THE SAME

BACKGROUND OF THE INVENTION

1. Field of the Invention

The present invention is directed to a high-density plastic composite to be used for inertia bodies of various mechanical and electric appliances, which is not only characterized in high-strength and rustproofing, but also provides aesthetic and colored products. This invention is also referred to the process for manufacturing the composite.

2. Prior Art

Because of its cost and the excellent molding characteristics, plastic materials have become widely used in various machine parts and electric appliances.

A property of plastic materials is that the density is lower than most of prior materials, especially metals. Although it is an advantage for making light weight products, but on the contrary, the property becomes a great disadvantage when the use requires heavy parts, such as flywheel, etc.

Two procedures are employed for manufacturing high-density (apparent) products by plastic materials. One procedure is using composite materials highly filled with metal powders, and other is to assemble metal parts with plastic parts.

But, some high-density plastic composite of prior art often decomposes by the action of metal ion eluted from metal powder, which cause chain scission of polymer, and dramatically decrease the mechanical properties of the composite. Another defect of the prior art is that some kinds of metal filler rusts to lose aesthetic appearances of the product, or since it gives only dark colored products and coloring is necessarily limited, the application of the materials for exterior parts is limited.

In the later procedure, manufacturing of metal parts, insert molding or work for assembling are required, which lose the greatest advantage of the plastic molding, namely, producing the parts by only one step.

The Problems to be Solved by the Present Invention

The inventors have accomplished the present invention for the object of developing new high-density composite which improves the defect of the prior arts described in the previous section, especially providing high strength sufficient to be used as engineered application, for such plastic materials as polyamide, thermoplastic polyesters, and polypropylene by preventing the decomposition of the polymer by the action of high-density fillers, and also being able to coloring.

SUMMARY OF THE INVENTION

The high-density composite referred to the present invention employs lead glass comprising 80 weight percent or more of lead monoxide (PbO) and 16 weight percent or less of silica ($SiO_2$), with particle size under 150 mesh, as the high specific gravity filler.

DETAILED DESCRIPTION OF THE INVENTION

An essential condition for giving sufficient strength to be used for engineering application is that the particle size of the said lead glass powder is under 150 mesh, preferably under 200 mesh. Another advantage of using fine powder is the synergistic effect for strength of the composite when fibrous reinforcements such as glass fiber are incorporated. Here, the particle size is represented by the Tyler standard sieve. Further advantage for using fine particle size filler under 150 mesh, is that the surface of the parts becomes smooth and are suitable for secondary processing such as coating. The flow of composite in injection molding process is also improved.

Lead glass powder used for highly filled plastic composite must be treated with coupling agents in advance of blending, or coupling agents are added in situ of the blending with resin. For this purpose, organic silane compounds, such as gamma-aminopropyltriethoxysilane, N-beta(aminoethyl)gamma-aminopropyltrimethoxysilane, N-phenyl-gamma-aminopropyltrimethoxysilane, gamma-glycidoxypropyl-trimethoxysilane, or zircoaluminate coupling agents having organofunctional ligand such as carboxyl, aliphatic, or methacryloxy groups can be used. Most preferred coupling agents differs with the resin to be compounded. Gamma-aminopropyl-triethoxysilane is most preferred for polyamide, and aliphatic zircoaluminate coupling agent is most preferred for polybutylene terephthalate.

The amount of the said coupling agents is in the range from 0.001 to 2.0 weight percent, more preferably from 0.01 to 0.5 weight percent, for lead glass powder. The effect is not sufficient if the contents is below this amount, and no further improvement is observed above this upper amount but the cost rises.

The strength and the rigidity of the lead glass filled composite is improved dramatically by incorporating reinforcements. The reinforcements preferred for this object are fibrous reinforcements, especially glass fiber. The amount of glass fiber is in the range from 1 to 40 weight percent, preferably from 10 to 20 weight percent. Other fibrous reinforcements include pottasium silicate (Wollastonite), Zonotolite ($6CaO.6SiO_2.H_2O$), pottasium titanate, pottasium sulfate fiber (Franklin fiber), MOS ($MgSO_4.5MgO.8H_2O$), and asbestos. The amount of these reinforcements is in the range from 1 to 40 weight percent of the composite, preferably from 10 to 30 weight percent of the composite.

The plastic material to be used for the composite of this invention includes many types of thermoplastic materials. Low density polyethylene, high density polyethylene, polypropylene, high impact polystyrene, ABS resin, etc., are suitable for general purpose high-density application. In order to improve impact resistance, it is preferable to incorporate ethylene-propylene rubber, polybutadiene rubber into polypropylene.

Among the suitable high performance engineering plastic materials are, crystalline plastics such as polyamide, polybutylene terephthalate, polyethylene terephthalate, polyphenylenesulfide, and amorphous plastic materials such as polycarbonate, polyphenylene ether-polystyrene alloy, polysulfone, and polyarylate are used for high-strength and high-density application, for example, flywheel. These engineering plastics are frequently blended with auxiliary polymeric components to make polymer alloys for the object of improving impact resistance, stress cracking resistance, and molding properties, which is also included in the present invention. But the present invention is not limited by the resins cited above.

In addition, general techniques for improving the performance of plastic compounds can be used for the lead glass filled plastic compound of this invention, for example, addition of stabilizers such as phenolic stabilizer and phosphite stabilizer to improve the discoloration of the composite at molding process, or addition of lubricants such as methylene bisstearte or stearic acid to improve the mold release and the surface smoothness of the parts.

The mixture of above components are melt compounded by general techniques to make high-density plastic composite. Another procedure for carrying out this invention is to mold parts directly from the powder mixture, by using reciprocating screw injection molding machine. Injection molding machine equipped with the mechanism described in Japan Pat. No. 1104727 is preferred for this procedure. This mechanism is more effective in carrying out the present invention, because it is more effective in dispersing the lead glass powder uniformely in the resin matrix.

In carrying out the injection molding of the composite referred to this invention, it is preferable to use a feeding equipment geared to the rotation of the screw of the injection molding machine, and control the feeding of mixture so that the material is fed in starve condition in the feeding section of the cylinder of the machine. The effect is, at first, that the material is considerably degassed, and secondary, since the resistance against the screw advance at the injection stage is reduced, screw can travel smoothly in the setted stroke with setted combination of screw position and screw advance speed, thus producing precision parts effectively. However, the composite itself referred to this invention is not limited by this process.

EFFECT

The present invention has developed a new composite material having combination of high-density and high strength, which is composed of 50-90 weight percent glassy material comprising 80 weight percent or more of lead monoxide, and plastic materials. The new composite improves the defects of the composite made by prior art, namely the generation of rust and the limit of coloring of the metal powder filled composite such as iron powder filled composite. In addition, by determining the optimum conditions for the said glassy material, optimum particle size and optimum surface treatment, and by the incorporation of fibrous reinforcement, the greater strength of the composite is obtained.

DESCRIPTION OF THE PREFERRED EMBODIMENTS

The following examples illustrate the composition of the present invention.

EXAMPLE 1

(1) 5000 g of lead glass (specific gravity 6.5) comprising 85 weight percent of lead monoxide (PbO) and 15 weight percent of silicic acid ($SiO_2$) and having particle size less than 150 mesh (Tyler standard sieve) is mixed in an intensive mixer (Super Mixer soled by Kawata Industries) with 200 r/m, and 25 g silane coupling agent (KBM903 soled by Shin-etsu Chemical Industries Ltd., diluted 10 times by modified ethyl alcohol/water=9/1 mixture) is added and mixed for further 30 minutes at 750 r/m, then the alcohol evaporated to make dry powder of surface treated lead glass powder.

(2) The whole quantity of treated lead glass made by process (1), 1000 g of Nylon 6 resin powder (1011F, soled by Ube Industries, Ltd.), 667 g of glass fiber (3-PE-454 soled by Nitto Spinning Company Ltd.) are mixed by tumble blender.

(3) The mixture made by process (2) is molded by the injection molding machine equipped with the kneading mechanism described in Japan Pat. No. 1104727. The material is fed through the screw feeder geared to the rotation of the screw of the injection molding machine, so that the feed section of the cylinder of the machine is kept at starve condition. The mold for tensile specimen No. 4 (3.2 mm thickness) specified by ASTM D638, and Bar specimen for flexural properties specified by ASTM D790 (127 mm length, 12.7 mm width, 3.2 mm thickness) was set on the machine and molding was operated by the conditions shown in Table 1.

EXAMPLE 2

Example 2 was conducted in a manner similar to Example 1, except lead glass powder of 200 mesh passed material was used.

Comparative Experiment

Comparative experiment was conducted in a manner similar to Example 1, except lead glass powder of 80 mesh passed material was used.

The results of the physical properties of Example 1, 2, and comparative experiment are shown in Table 2. Example 1 and 2 have greater strength than comparative experiment, so they are able to replace light metal die-cast parts. In addition, the specific gravity of the composite is in the same level of light metal, the parts made by this composite possesses greater inertia than the parts made by conventional high strength plastic, and furthermore, since it is massive and more high quality in feeling, it is an useful molding material for industrial use.

Effect of the Invention

This invention has developed composite material having greater mechanical strength capable of replacing light metal die-cast parts, by determining the particle size of the said lead glass powder, surface treated with specified coupling agents, and if necessary, addition of glass fiber or inorganic fibrous reinforcements. Another advantage of the composite is having massive and high quality feeling.

TABLE 1

| MOLDING CONDITION | |
| --- | --- |
| Cylinder temperature | 270° C. |
| Screw rotation | 100 r/m |
| Injection pressure | 100 kg/cm$^2$ (gauge) |
| Holding pressure | 60 kg/cm$^2$ (gauge) |
| Total injection time | 5 seconds |
| Cooling time | 15 seconds |
| Mold temperature | 80° C. |

TABLE 2

| PHYSICAL PROPERTIES | | | |
| --- | --- | --- | --- |
| | Example 1 | Example 2 | Comparative experiment |
| Tensile strength, N/mm$^2$ | 186 | 157 | 90 |
| Flexural strength, N/mm$^2$ | 291 | 255 | 196 |
| Flexural modulus, N/mm$^2$ | 15800 | 15600 | 15000 |
| Izod impact, kg · cm/cm | 11.4 | 9.7 | 7.0 |
| Specific gravity | 3.5 | 3.5 | 3.5 |

We claim:

1. High-density and high strength plastic composite having a specific gravity of 3.0 or more, composed of about 10-50 weight % of a thermoplastic polymer and 50–90 weight percent of lead glass powder comprising 80 weight percent or more of lead monoxide (PbO) and 16 weight percent or less of silicic anhydride ($SiO_2$), with particle size under 150 mesh.

2. High-density and high strength plastic composite as defined in claim 1, composed of 50–90 weight percent of glassy powder comprising 80 weight percent or more of lead monoxide (PbO), surface treated with coupling agents, with particle size under 150 mesh.

3. High-density and high strength plastic composite as defined in claim 1, where the composite is composed of; 50–90 weight percent of glassy powder comprising 80 weight percent or more of lead monoxide and surface treated with coupling agent, with particle size under 150 mesh, 1–40 weight percent of glass fiber; 5–50 weight percent of thermoplastic material.

4. High-density and high strength plastic composite as defined in claim 1, where the composite is composed of; 50–90 weight percent of glassy powder comprising 80 weight percent or more of lead monoxide and surface treated with coupling agent, with particle size under 150 mesh, 1–40 weight percent of inorganic fibrous filler, 5–50 weight percent of thermoplastic material.

* * * * *